No. 674,436. Patented May 21, 1901.
W. COVINTREE.
PNEUMATIC TIRE.
(Application filed Apr. 16, 1900.)
(No Model.)

UNITED STATES PATENT OFFICE.

WALLACE COVINTREE, OF MAYS LANDING, NEW JERSEY, ASSIGNOR TO JOHN A. WIEDERSHEIM, TRUSTEE, OF PHILADELPHIA, PENNSYLVANIA.

PNEUMATIC TIRE.

SPECIFICATION forming part of Letters Patent No. 674,436, dated May 21, 1901.

Application filed April 16, 1900. Serial No. 13,018. (No model.)

*To all whom it may concern:*

Be it known that I, WALLACE COVINTREE, a citizen of the United States, residing at Mays Landing, in the county of Atlantic, State of New Jersey, have invented a new and useful Improvement in Pneumatic Tires, which improvement is fully set forth in the following specification and accompanying drawings.

My invention relates to an improvement in pneumatic tires; and it consists of a series of strips or plies of non-puncturable material located within the tire, at the tread portion thereof, and being free except at their side edges, so as to properly yield as occasioned, while, however, preserving the elasticity and liveliness of the tire and guarding the tread against the action of puncturing articles injurious to the inflated condition of the tire.

Figure 1:
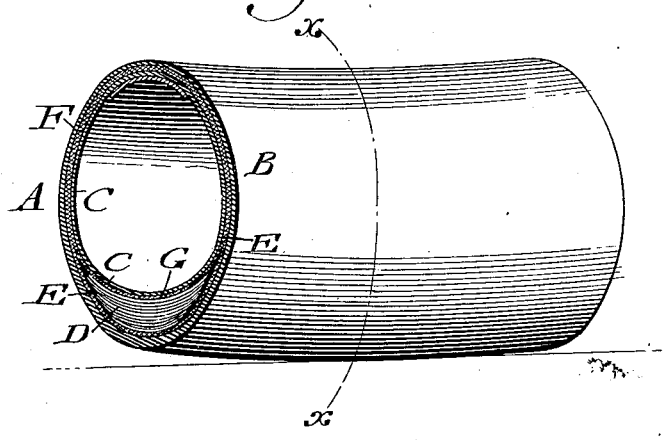
Figure 2:
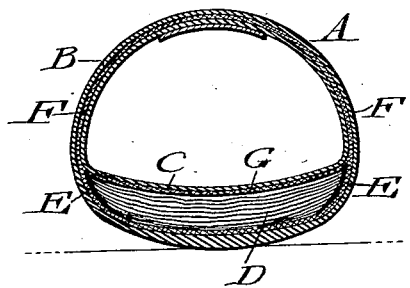

Figure 1 represents a perspective view of a portion of a tire embodying my invention. Fig. 2 represents a transverse section thereof on line x x, Fig. 1, showing the tire in yielding condition.

Similar letters of reference indicate corresponding parts in the figures.

Referring to the drawings, A designates a portion of a pneumatic tire, the same consisting of an outer tube B and an inner tube C, the latter being eccentric within the former, leaving a space between the tread portions of said tubes, within which space is arranged a reinforcement of exterior and intermediate members composed of a series of strips or plies D of non-puncturable material, which are arranged one upon the other and are secured to the respective portions of the outer tube at their side edges E, leaving the bodies or portions of said plies between said edges disconnected one from the other, whereby as circumstances arise the tire is free to yield without resistance on the part of said plies D, it being noticed that the elasticity of the tire, especially at its tread portion, is not interfered with, and said portion is practically reinforced, thus increasing the strength of the tire, while the plies provide a barrier to the entrance of points of tacks and other puncturing articles into the pneumatic chamber, whereby the inflated condition of the tire is preserved.

As a preferred form the plies D consist of pieces of strong or stout paper, which answer admirably for the purpose, as they are light and durable and in their condition packed one upon the other resist tacks or other pointed articles entering the outer tube.

Interposed between the inner and outer tubes, which are preferably rubber or rubber compound, is a layer of textile fabric, as at F. In the present case the side edges of the plies D are secured to the said layer F, while a layer G of such textile fabric may be interposed between the plies D and the adjacent portion of the inner tube; but said layers may be dispensed with if desired.

As means for securing the plies D to the adjacent portion of the tube or layer, I may use cement or other adhesive material.

Having thus described my invention, what I claim as new, and desire to secure by Letters Patent, is—

1. As an improved article of manufacture, a pneumatic tire comprising an inner tube or section, and an outer tube or section, said sections being connected together in such manner as to provide a space in line with the tread of the tire and a reinforcement arranged within the said space consisting of a series of paper strips secured at the side edges only.

2. As an improved article of manufacture, a pneumatic tire comprising the inner tube or section, the outer tube or section, the intermediate layers of textile fabric, and the reinforcement paper strips arranged between the tread portions of the inner and outer tubes or sections, said paper strips being secured at their side edges only in contradistinction to having their surfaces connected.

3. As an improved article of manufacture, a pneumatic tire comprising the inner tube and the outer tube, said tubes being arranged as shown, the reinforcement paper strips, and the intermediate layers of paper being secured at their side edges only, whereby the elasticity of the tread of the tire is maintained.

WALLACE COVINTREE.

Witnesses:
JOHN P. ASHMEAD,
JOSEPH SUTTON.